April 26, 1938.   L. V. CASTO   2,115,409
DECORATIVE TREATMENT FOR LAMINATED STRUCTURES AND PRODUCT THEREOF
Filed Oct. 21, 1935   2 Sheets—Sheet 1

INVENTOR.
BY Lloyd V. Casto
Bates, Golrick & Teare
ATTORNEYS.

April 26, 1938.   L. V. CASTO   2,115,409
DECORATIVE TREATMENT FOR LAMINATED STRUCTURES AND PRODUCT THEREOF
Filed Oct. 21, 1935   2 Sheets-Sheet 2

INVENTOR.
Lloyd V. Casto.
BY
Bates, Golrick & Teare
ATTORNEYS.

Patented Apr. 26, 1938

2,115,409

UNITED STATES PATENT OFFICE 2,115,409

DECORATIVE TREATMENT FOR LAMINATED STRUCTURES AND PRODUCT THEREOF

Lloyd V. Casto, Detroit, Mich.

Application October 21, 1935, Serial No. 45,927

17 Claims. (Cl. 41—22)

This invention relates to a method or process for producing decorative sheets or panels and the product of such method or process.

The objects include the provision of a novel composite decorative panel e. g. including a hard, substantially transparent face member; a glass sandwich including a novel decorative treatment which is viewable to advantage on one or, selectively, both faces of the sandwich; a novel long-wearing composite sheet, including a transparent facing element, the sheet being decorated in representation of natural or artificial patterns, (i. e. of wood, marble, tile, animal skins, textile appearances, etc.); and a novel decorative treatment for glass and other transparent material,— together with various modifications of a novel method or process of producing such articles or similar articles of manufacture.

Other objects and features of the invention will become apparent from the following description, relating to the accompanying drawings. The essential characteristics are summarized in the claims.

Figure 1:
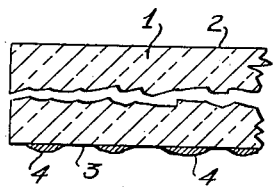
Figure 1A:
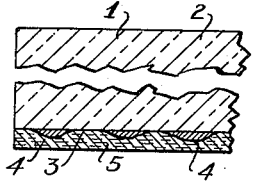
Figure 1B:
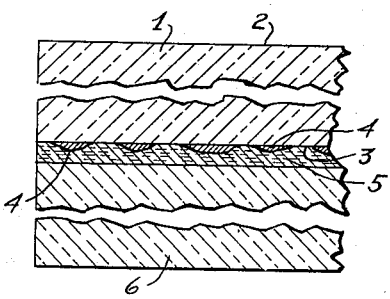
Figure 2:
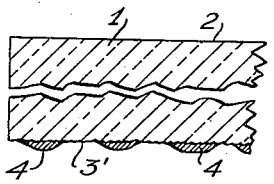
Figure 2A:
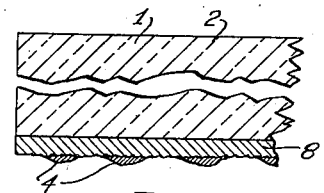
Figure 3:
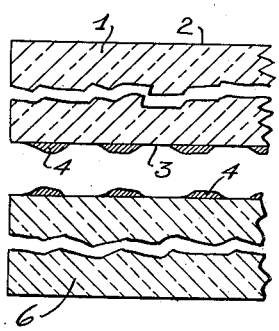
Figure 3A:
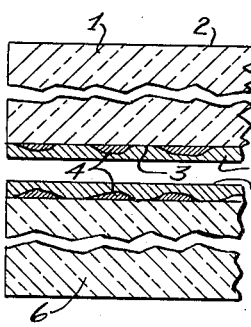
Figure 3B:
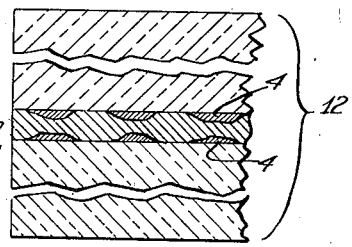
Figure 3C:
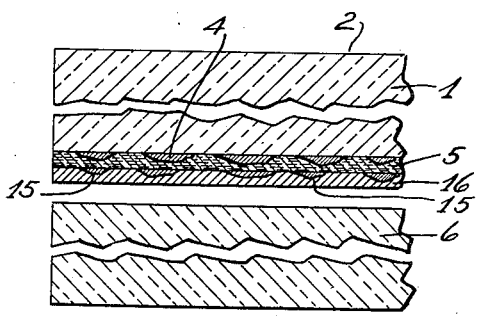
Figure 4:
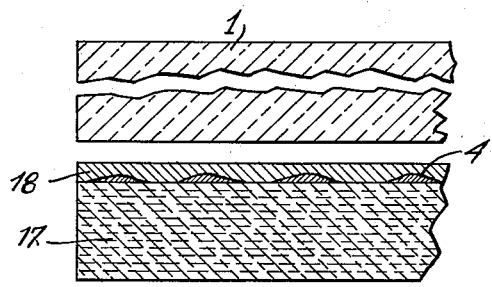
Figure 5:
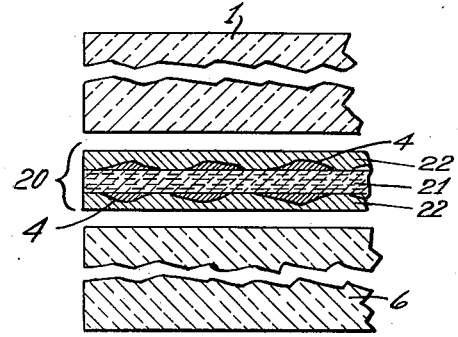
Figure 6:
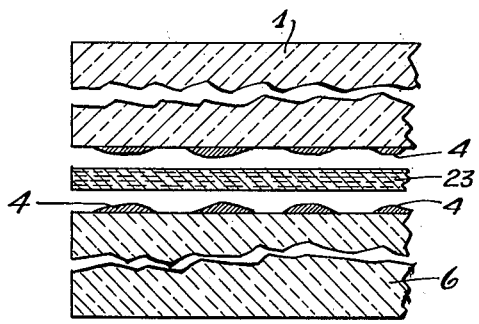
Figure 7:
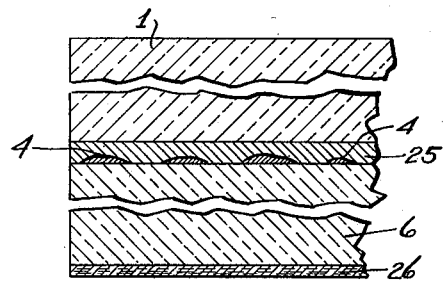
Figure 8:
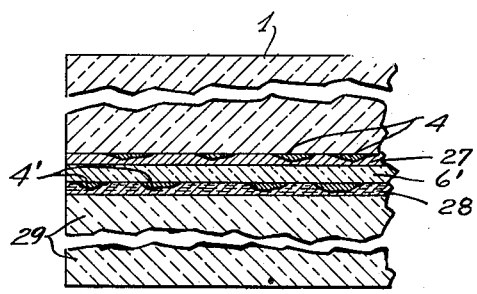

Referring to the drawings (each being an enlarged e. g. diagrammatic cross-sectional view), Fig. 1 shows a glass panel with a design imprint on one side; Fig. 1a is the same panel and imprint with a ground and/or base panel attaching coat placed over the design imprint or treatment; Fig. 1b shows the completed composite article; Fig. 2 shows a modification of Fig. 1, in respect to the treatment of the imprinted surface of the glass; Fig. 2a shows special "sizing" treatment for the glass and decorative imprint thereon; Fig. 3 is a view showing the design imprint applied to both sheets of glass, as one step in one modification of the method of making the design viewable on both sides of the completed panel; Fig. 3a shows a second step in the treatment of a glass panel according to Fig. 3; Fig. 3b shows the completed composite two-way view panel; Fig. 3c shows a modification of the procedure in producing a glass sandwich, the decorative treatment of which is viewable on both sides of the composite panel; Fig. 4 is a view showing two panels in the process of being assembled, one panel being treated to produce a modified decorative effect; Fig. 5 shows still another modification and illustrates a composite decorative element about to be laminated with sheets of glass e. g.; Fig. 6 is a view similar to Fig. 3a, but showing a modified laminating and/or ground color element; Fig. 7 shows a composite panel (assembled) and having a further modified ground or underlying color effect; and Fig. 8 is a view of a composite panel, made by using a still different design and ground color treatment.

One practical application of the present invention is in the provision of long-wearing panels for furniture, such as desks, table tops, portable decorative screens and the like, whereby, irrespective of the actual materials of construction used for the furniture, a permanent surface decoration may be had, representative of any desired material or design.

In some instances it is desirable to provide for a change of design in the same decorative member, whereby the user may selectively display either of two patterns for example, as in a panel, viewable to advantage from both sides.

Further practical applications include wall panel decorations, either in large sections or tile effects, and for replacement of glass panels and other parts in buildings, where a particular decorative effect is desired on one or both sides thereof; examples being doors, windows and other wall openings.

The invention, at least in one respect, is on the order of that disclosed by the patent to R. F. Brown, No. 1,685,396, issued September 25th, 1928.

In the Brown patent, a decorative treatment for a glass panel is shown and described, consisting of the application of a decorative design as an open tracery in suitable color material on one side of a glass panel, the same being underlaid with a suitable ground coat having the general color characteristics of the material which the design tracery is directed to represent or simulate. Such treatment on one side only of a glass panel is limited in its application, principally due to the fact that the decorative treatment is unprotected from destructive mechanical and chemical action and agents on the side which is ordinarily underneath or concealed, and, of course, such decorative panel is not reversible i. e. usable to advantage with either side out. The present process makes available a stronger and more resistant or durable panel on the order of that shown by Brown, one that has a greater variety of advantageous uses, and one that may readily be made duplex in decorative effect.

The present invention further contemplates the advantageous use of relatively inexpensive— as drawn—sheet glass, as distinguished from "plate" glass, such as is usually subjected to grinding and polishing operations as part of its manufacture.

Referring now to Fig. 1, this figure shows a glass panel 1, having a surface 2 adapted to be exposed, and a surface 3 on which the decorative design treatment, indicated as disconnected blocks of suitable pigment or color material 4 may be applied directly. This application may comprise a treatment by photogravure ink, as from an etched plate or roll, and suitable ink or pigment transfers, as taught in the Brown patent, or the patent to J. P. Henry, No. 1,548,465, issued August 4th, 1925, or by any known or suitable definite transfer process, as, for example, offset lithography, or by decalcomania. In general, the decorative medium used has as part of its composition suitable adhesive material to cause the design to tenaciously adhere to the surface of the glass, or sizing or other treatment thereon, making it, for example, slightly porous or tacky or otherwise especially adapted to cause the decorating medium (graining paste or the like), to tightly adhere in true transference, without having to embody in the decorating medium any special adhesive ingredient suited to the decoration of glass. Usually, I propose that a transparent adhesive coating, such as mentioned, be placed on the glass before the design is transferred or otherwise applied to the glass, and, for convenience, expressions such as "applied to the glass" etc. used herein, include application to suitable sizing etc. films on the glass.

After the design has been applied, it is usually necessary to apply, as by spraying, dipping or otherwise, a suitable ground and/or leveling coating 5, (see Fig. 1a), which may be greatly modified, as will be shown. This may be lacquer or varnish, suitably treated so as to make it readily and tenaciously adhere to the glass or sizing film or treatment thereon as well as to the previous color treatment (the design). This coating 5 usually embodies a ground color (dye or pigment) representing the contrasting back-ground effect of the material simulated or represented by the design, and is preferably—in this modification—substantially opaque to direct transmission of light therethrough. The substantial opacity is diagrammatically indicated by horizontal broken lines crossing the usual (diagonal) section indicating lines.

It is contemplated that either or both of the applications 4, 5 may be of materials capable of being tempered and/or rendered more adherent to the adjacent surfaces by baking.

As shown in Fig. 1b, a second glass panel, such as 6, is secured to the back side of the coating 5, as by suitable adhesive and/or heat and/or pressure. Here again, the underlying glass panel 6 may have its surface especially treated as by a transparent e. g. film of say gelatin or, cellulose base lacquer, or resin lacquer etc. applied thereto, to which the coating 5, which may have a nitrocellulose base or the usual varnish bases will readily adhere, particularly if the coating 5 and/or the film is softened by a suitable solvent. The backing glass 6 may be applied while the coating 5 is still plastic and in such case very little pressure is recommended; it being a feature of the invention that if subsequent separation is likely to occur it shall (in this form) occur between the coating 5 and the backing sheet, rather than between the decorative treatment and the display sheet 1.

Referring to Fig. 2, this figure shows an example of treatment to which either glass panel may be subjected on one surface to assist in obtaining a firm bond between the glass and decorative treatment, so that at least between these elements the adherence will be permanent for the life of the article. As shown, the under surface 3' to which the design imprint 4 is applied is made microporous, slightly rough or granular, as indicated. This may be done by etching the surface which is to receive the design, or by sand blasting or otherwise abrading it, or by the application of material such as silicate of soda thereto.

Alternatively, a suitable transparent sizing film 8, as of gelatin, say isinglass, or an acetate or nitrocellulose etc. film, may be applied on the smooth glass surface, and this film may have suitable treatment to render it pocketed, microporous, rough or granular to the desired extent for securing a firm bond with ordinary decorative materials adapted to be applied by transfer methods such as above suggested.

Crystalline deposits on the glass or film may be used to enhance the bond; or ordinary "frosting" treatment can be effected, as is well known in the manufacture of glass, cellulose, polymerization and condensation products.

In respect to a pitted, microporous, granular or frosted surface on which the decorative treatment may be applied, as above described, such may be rendered substantially entirely imperceptible on the display face of the finished work, because of the intimate bonding of one transparent or nearly transparent medium to another, (as glass to gelatin, lacquer, varnish, etc.). This is comparable to the effect of wetting the frosted surface of frosted glass, as with water or oil, whereupon the frosted effect is greatly subdued and may sometimes be made to substantially disappear. However, in some cases the frosted or granular surface is of distinct advantage, as where the natural e. g. surface represented by the treatment, is granular, porous, flaky, etc., as in the case of wood, parchment, marble, etc. In such event the frosting e. g. treatment is ordinarily carried out to a greater extent, that is, producing deeper or more visibly distinct pits or pores, or in general coarser granular surface effects so that subsequent applications of decorative etc. material in intimate bonding relationship therewith will not obliterate the granular or flaky apearance.

It is to be understood that in the arrangements hereof, wherein the design is intended to be viewable only on one side of the composite panel, the backing sheet 6, instead of being glass, may comprise any other suitable stiffening element, such as Bakelite, Formica, Prestwood, Micarta, etc., and in other arrangements described one main sheet may, for example, comprise cellulose material cut from blocks as commonly practiced, or transparent condensation or polymerization products, etc. In such event, special adhesive treatment may be required to effect the desired adherence of the ground coating to the non-vitreous sheet, in keeping with the present disclosure.

Suggested adhesives comprise asphalt and the various known adhesive compounds containing it, gelatinous glues and cements, silicate of soda, casein base adhesives, resin base adhesives (natural or synthetic), glyptal family of synthetics e. g., nitrocellulose base adhesives, Bakelite family of synthetics, vinyl and compounds thereof, etc. In general, the above and others hereinafter mentioned are suitable, whether or not the backing is of glass. The adhesive used is determined with relation to the strength of bond between the decorative treatment and the glass etc. panel or panels through which the design is to be viewed, as above explained.

Referring to Fig. 3, this illustrates a simple method of decorating the composite sheet for enabling the display of either side to advantage. Here the transparent panels 1 and 6 are both imprinted by such processes as above mentioned, with suitable open design traceries 4 representative of say marble, wood, etc., as in ordinary graining, and the ground coating or other treatment may be applied to one or both of the design bearing panels as by spray coating for subsequent lamination of the two panels. In some instances a translucent ground coating may suffice for a two-way view of the design.

One procedure, as illustrated in Fig. 3a, comprises the application of a ground color layer 10 to the underside of the panel 1 over the design 4 thereon, this ground color being ordinarily either opaque or not wholly transparent. A similar or wholly or partially transparent coating may be applied as at 11 to "level" the design treatment of the other panel. The coating 11 over the design tracery 4 on the panel 6 may be of transparent varnish, lacquer, etc., adapted to be secured to the coating 10 and may or may not contain ground color or pigment, since the "ground" color can just as well be furnished by the coating 10.

Fig. 3b represents the two decorated panels 1 and 6 combined to form a single panel 12, the two coatings 10 and 11 being joined to each other as above indicated. Suggested adhesives for securing the two panels together are, in addition to those already mentioned: the various gelatin adhesives, isinglass, for example; various cellulose solutions, an example being collodion; and the various natural adhesives such as Canada balsam, casein, copal or shellac. Inorganic adhesives such as sodium silicate and litharge may also be used. The above in general are selected relative to the strength of the bonding between the decorative treatment and the glass, as well as in accordance with whether or not transparency is desired for the uniting medium, the latter factor depending on whether one or both coatings (10 or 11) is or are wholly or nearly transparent.

As mentioned above, it is a feature of the present invention that the adherence between inner portions of the treatment be less effective than the adherence between the actual decorative coating and the glass or the sizing e. g. thereon, to the end that in the event separation occurs this will be more likely to occur at an intermediate surface, and in case of a two-way view panel, the less firm bond is between the decorative coatings, so that any separation will be imperceptible on either face of the finished work intended for display.

A further modification is shown in Fig. 3c, wherein only one of the rigid panels is subjected to decorative treatment. Here the design tracery to be viewed through the panel 1 is applied in accordance with any of the above disclosures, as at 4. A ground color coating is applied over the same, as at 5, the same being preferably substantially opaque and having the proper color or component to complement the design; another open design tracery is then applied on the "back" of the coating 5, as at 15, this being subsequently treated if desired by a transparent leveling coating sprayed on or otherwise suitably applied, as at 16, and the other glass panel 6 is then caused to adhere to the coating 16, as above explained.

In this instance, it will be apparent that as before stated a single translucent ground coating may suffice for a two-way view, particularly if the design being reproduced requires no decidedly contrasting color effect.

It is to be understood that wherever one side only of the composite panel is to be displayed, the ground may be obtained partially or entirely by the color effects of the underlying glass or other backing panel. For instance, as shown in Fig. 4, representing the decorative treatment 4 on the backing glass e. g. panel 17, the said panel may be opaque or nearly opaque as by densely colored glass of proper color, the two panels being subsequently laminated to form a sandwich, as previously described. The leveling coating 18 over the design would in such case be substantially transparent.

As illustrated in Fig. 5, the decorative treatment may comprise a separate composite medium such as indicated generally at 20. This may have an intermediate layer 21, say of cellulose acetate or nitrate, glass, paper or any other material, to which the design transfer 4 is applied on one or both sides, together with subsequent substantially transparent locking, levelling or adhesive coatings 22, the sandwich being completed by laminating the medium 20 with the two glass panels 1 and 6; both being, in the specific example shown, preferably substantially transparent. This results in a two-way view composite panel.

In any of the above, either glass panel may be clear transparent glass or glass of any desired tint.

Referring to Fig. 6, this illustrates a modification of the arrangement shown in Fig. 3, wherein the decorative tracery 4 is applied to the glass panels 1 and 6, for example as previously described and the laminating is effected by a suitably pigmented or colored plastic adhesive sheet 23; uncured cellulose ester or other cellulose sheet material or polymerization products being suitable examples of materials for such sheet. Alternatively, the member 23 may comprise any suitable fabric or membrane which may have coatings of lacquer, varnish, etc. on one or both sides; the fabric, membrane or coatings containing or embodying the desired pigment or color.

Referring to Fig. 7, this is a further illustration of a single-decorative-face sandwich, comprising a top glass panel 1, a transparent coating 25, design tracery 4 applied as to the glass or other substantially transparent backing 6, the latter having applied on the back thereof, as at 26, a suitable ground which is visible through the transparency afforded by the backing glass 6 and the other transparencies mentioned. The ground may have any suitable protective treatment (not shown) applied over it to prevent abrasion.

As a further modification, Fig. 8 shows two sheets of transparent material (glass e. g.) at 1 and 6, having the design tracery 4 applied to either of these sheets, together with a suitable transparent or substantially transparent levelling and/or binder coating 27, as above described, and a ground color and/or further design application being included as at 4', 28 underlying the sheet 6' and overlying a final backing sheet 29 of material such as glass. The sheet 29 may furnish the ground color or component, as in Fig. 4, in which case the ground color would be omitted from the coating 28.

The materially separated transfers 4 and 4' are a feature of the Fig. 8 arrangement giving depth and changeability of appearance to the face of the panel when viewed from various angles. The design treatments 4 and 4' are preferably different designs for positive non-registration, to avoid near registration or "dizzy" effects, say when viewed from an angle nearly normal to the decorated surface.

In any of the above modifications, metal or other highly reflective material may be deposited on or embodied in the backing sheet or panel, or on the ground coatings or elements described, or used in other ways, so as to effect the ground and/or design tracery, in general accordance with the disclosure of the application of L. V. Casto, Serial No. 11,496, filed March 6th, 1935, and/or the various lusterization treatments of the application of Lloyd V. Casto, Serial No. 34,034, filed July 1st, 1935, may be used, in connection herewith in any suitable fashion.

I claim:

1. The process of producing a decorative glass sandwich, comprising imprinting color material in open design forms on respective surfaces of two substantially transparent glass panels, and uniting the design bearing surfaces of the panels with an adhesive containing color material contrasting with both designs.

2. The process of producing a decorative glass sandwich comprising treating one surface of a glass panel to produce thereon a rough surface, applying color material to form a decorative open grain design on said rough surface, drying the color material, applying an adhesive over the decorative design and the glass, and attaching another glass panel to the first panel adjacent the design by means of said adhesive.

3. The process of producing a decorative glass sandwich comprising adhesively applying an open decorative transfer and a contrasting color coating to each of two transparent glass panels, and attaching the two panels together with an adhesive which is less effective than the combined adhesive force of the transfer and color coatings in respect to the glass, said adhesive being disposed between the decorative treatment of the two panels.

4. A decorative glass sandwich, comprising two glass panels and means bonding the same together, said means including an interposed decorative treatment comprising an open design tracery directly adjacent and firmly adhering to one of the glass panels and a ground color medium directly adjacent and adhering less firmly to the other glass panel.

5. A decorative glass sandwich, comprising two glass panels and an interposed decorative body comprising an open design tracery adjacent one of the glass panels and operatively adhering thereto, and a ground color medium contrasting with the color of the design tracery, adhering to the design tracery and operatively adhering to both glass panels, said color medium reaching through the open design for adherence to the panel adjacent which the design is disposed.

6. A decorative glass sandwich, comprising a glass panel, means providing a roughened face on one side of the panel, an open design tracery and separate ground color medium both adhering to said roughened face, and a rigid backing panel having a smooth face operatively secured to the ground color medium.

7. A decorative glass sandwich, comprising two glass panels, each having an open design tracery adhering thereto, and means interposed between the design bearing surfaces of said panels and having regions adhering to both panels and other regions adhering to said traceries, said means forming a ground color for respective traceries, visible through both panels.

8. A composite laminated decorative article, comprising a glass panel, an open design tracery and contrasting color material secured to one face of the panel in intimate bonding relationship therewith, and a rigid panel having one surface secured to the back side of the said color material in bonding relationship therewith, the bonding relationship between said rigid panel and said material being less strong than the bonding relationship between said color material and the glass panel.

9. A decorative glass sandwich, comprising a glass panel, an open design tracery and contrasting color material secured to one face of the panel in intimate bonding relationship therewith, and another glass panel having one surface secured to the back side of the said color material in bonding relationship therewith, and means operating to render the bonding relationship between the second glass panel and said color material less strong than the bonding relationship between said color material and the first mentioned glass panel.

10. A decorative glass sandwich, comprising two layers of glass in fixed relationship with each other, interposed color design traceries operatively associated with respective surfaces of said panels, contrasting color material interposed between said panels and in underlying and overlying relationship to the respective design traceries, said color material having a greater tendency to disintegrate in regions removed from those adjacent the glass surface than to become visibly detached from the glass surface of either panel.

11. A decorative glass sandwich comprising a glass panel having color material in the form of an open design tracery operatively secured thereto and visible therethrough, a transparent sheet operatively secured to the same face of said panel in underlying relation to the tracery and means on the underside of the sheet having a color contrasting with the said tracery and forming a ground therefor, visible through said sheet and said panel.

12. A decorative glass sandwich comprising a glass panel having color material in the form of an open design tracery operatively associated with one face thereof, a preformed transparent sheet secured to the panel in underlying relation to the tracery, and color material forming another open design tracery operatively associated with the underside of the sheet in non-registering relation to the first tracery and visible through the glass panel therewith.

13. A decorative glass sandwich comprising two substantially transparent glass panels laminated with an interposed open design in color, the exposed face of one of the panels having a ground color coating thereon which is visible through the other panel past the design.

14. A decorative sandwich comprising two transparent sheets laminated with an interposed open design pattern of color material, and a second open design pattern on the exposed face of one of the panels out of registration with the first.

15. A sandwich according to claim 14, wherein there is a contrasting ground color element overlying said second open design pattern.

16. The process of producing a decorative glass sandwich comprising imprinting color material in the form of an open design in varying tonal depth on a uniform surface of a transparent glass panel, applying a substantially opaque adhesive coating over the design so as fully to cover it and form a background for the design when viewed through said panel, and uniting a second glass panel to the adhesive coating.

17. A decorative glass sandwich, comprising a substantially transparent glass panel having an open design image thereon on one side, a film of color material underlying the design, contrasting therewith and visible through the glass panel as a background for the design, a second open design image adhering to the underside of the color film and contrasting therewith so that portions of said film are visible as a background for the latter design when viewed from below, a second glass panel, and adhesive transparent means which operates to attach the second panel to the decorative treatment afforded by the second design and its background.

LLOYD V. CASTO.